July 9, 1963 W. E. SCHOBER 3,096,920

TAPE DRIVING MECHANISM

Filed March 7, 1961 4 Sheets-Sheet 1

INVENTOR.

WAYNE E. SCHOBER

BY

Merchant & Merchant

ATTORNEYS

July 9, 1963 W. E. SCHOBER 3,096,920

TAPE DRIVING MECHANISM

Filed March 7, 1961 4 Sheets-Sheet 2

INVENTOR.
WAYNE E. SCHOBER
BY
Merchant & Merchant
ATTORNEYS

July 9, 1963 W. E. SCHOBER 3,096,920

TAPE DRIVING MECHANISM

Filed March 7, 1961 4 Sheets-Sheet 3

INVENTOR.
WAYNE E. SCHOBER
BY
Merchant & Merchant
ATTORNEYS

INVENTOR.
WAYNE E. SCHOBER
BY
Merchant & Merchant
ATTORNEYS

United States Patent Office 3,096,920

Patented July 9, 1963

3,096,920

TAPE DRIVING MECHANISM

Wayne E. Schober, Minneapolis, Minn., assignor to Viking of Minneapolis, Inc., Minneapolis, Minn., a corporation of Minnesota Filed Mar. 7, 1961, Ser. No. 93,907
18 Claims. (Cl. 226—181)

This invention relates generally to improvements in tape handling machines, and more particularly it relates to an improved tape driving mechanism and control for the pressure rollers of magnetic tape machines.

In order to bring about a better understanding of this invention, the following introductory remarks are set forth. While this invention is applicable to tape drive mechanisms for tape materials without regard to the uses and characteristics of the tape material, this invention nevertheless has been found to be a particular advantage when it is employed in the drive mechanism for magnetic tape in tape recording and reproducing machines. In such machines, a suitable magnetic tape is supplied to the machine in a continuous loop-type cartridge wherein an endless tape is wound upon a single reel or spool from which, in use, it is removed and to which it is simultaneously returned; the tape being in fact wound off the inside of the coil of tape on the spool and being rewound on the perimeter of the coil.

In most magnetic tape machines the tape is driven at a constant speed through a power operated capstan with which a tape is maintained in frictional driving engagement by a suitable pressure roller. For the purpose of loading and unloading any such machine it is necessary to retract the pressure roller to an inoperative position sufficiently spaced from the capstan to allow for the insertion of the tape between the capstan and pressure roller. However, in machines designed to handle tape cartridges, such as the one disclosed herein, the amount of movement of the pressure roller between the normal inoperative position and the normal operative position is much greater than in the more conventional types of tape handling machines; and it is therefore desirable in such cartridge type machines that mechanism be provided for moving the pressure roller from a normal vertical axis position above the deck of the machine to a generally horizontal axis position below the deck of the machine in order to allow the cartridge to be slid over the deck to an operative position without interference from the pressure roller. Generally speaking, it has been the usual practice in the art to provide such a pressure roller actuation mechanism of a completely manually operated type or of a completely magnetically controlled type. The former type has been proven undesirable because it did not permit the use of a remote control mechanism for the pressure roller, and the latter has also been proven undesirable because, in addition to being very noisy, the same also required a relatively long throw of the magnetic solenoid and therefore the relatively great inertia forces created thereby were extremely hard on the pressure roller and also on the other mechanism of the tape machine. A further disadvantage of previously known types of pressure roller control mechanisms is that the tape cartridge is not engaged in the tape machine when such mechanism is in its inoperative position.

In light of the above outlined problems and considerations, an important object of this invention is the provision of an improved tape driving and control mechanism for the pressure rollers of magnetic tape machines in which the swinging movement of the pressure roller is sectioned whereby the pressure roller moves between an inoperative position, a near operative position, and a fully operative position wherein the tape cartridge is in engagement with the tape machine when the pressure roller is in said near operative position.

Another object of this invention is the provision of an improved tape driving and control mechanism for the pressure rollers of magnetic tape machines in which the pressure roller may be quickly moved between the three above described positions, and this substantially irrespective of the length of the swing of movement of the pressure roller between its operative and inoperative positions.

Another object of this invention is the provision of an improved tape driving and control mechanism for the pressure rollers of magnetic tape machines which utilizes an electromagnetic actuator having a so-called plate or clapper type armature, as distinguished from a hollow core solenoid and plunger type armature, the former presenting several advantages, including lightness in weight, and greatly reduced inertia forces so as to reduce noise and jarring resulting therefrom.

Another object of this invention is the provision of an improved tape driving and control mechanism for the pressure rollers of magnetic tape machines which uses an electromagnetic actuator producing a very strong magnetic attraction with respect to a plate or clapper type armature when and only when the armature is very close to the poles of the core structure of the electromagnetic actuator, which therefor permits the use of a relatively more compact and lower cost coil or solenoid than is necessary in the case of hollow core solenoids and plunger type armatures.

Another object of this invention is the provision of an improved tape driving and control mechanism for the pressure rollers of magnetic tape machines in which the swinging movement of the pressure roller between the above described near operative and operative positions comprises a relatively short throw with respect to previously known types of such mechanisms, and which therefore produces a soft, non-destructive and extremely less noisy operation.

A still further object of this invention is the provision of an improved tape driving and control mechanism for the pressure rollers of magnetic tape machines which, when it employs magnetically operated means for actuating a portion of the swinging movement of the pressure roller, does not run hot, and is relatively inexpensive to manufacture since the same does not require the use of a moving core solenoid construction.

A still further object of this invention is the provision of a mechanism of the general character described above wherein the pressure roller is mounted for swinging movements to and from the capstan and which involves adjustable means whereby the degree of driving pressure exerted by the pressure roller on the tape and the capstan at the operative position of the pressure roller may be easily adjusted within a considerably wide range so as to adjust for wear of the pressure roller, and which also involves adjustable means associated with the portion of the swinging movement of the pressure roller between the near operative and operative positions thereof whereby the tape machine may be adjusted for parallelism between the respective axes of the pressure roller and the capstan so as to prevent axial running of the tape therebetween.

The foregoing and other objects and advantages of this invention will become apparent from the following detailed specification, appended claims, and attached drawings.

Referring to the drawings wherein like reference characters indicate like parts or elements throughout the several views.

Figures 1, 2, 8:
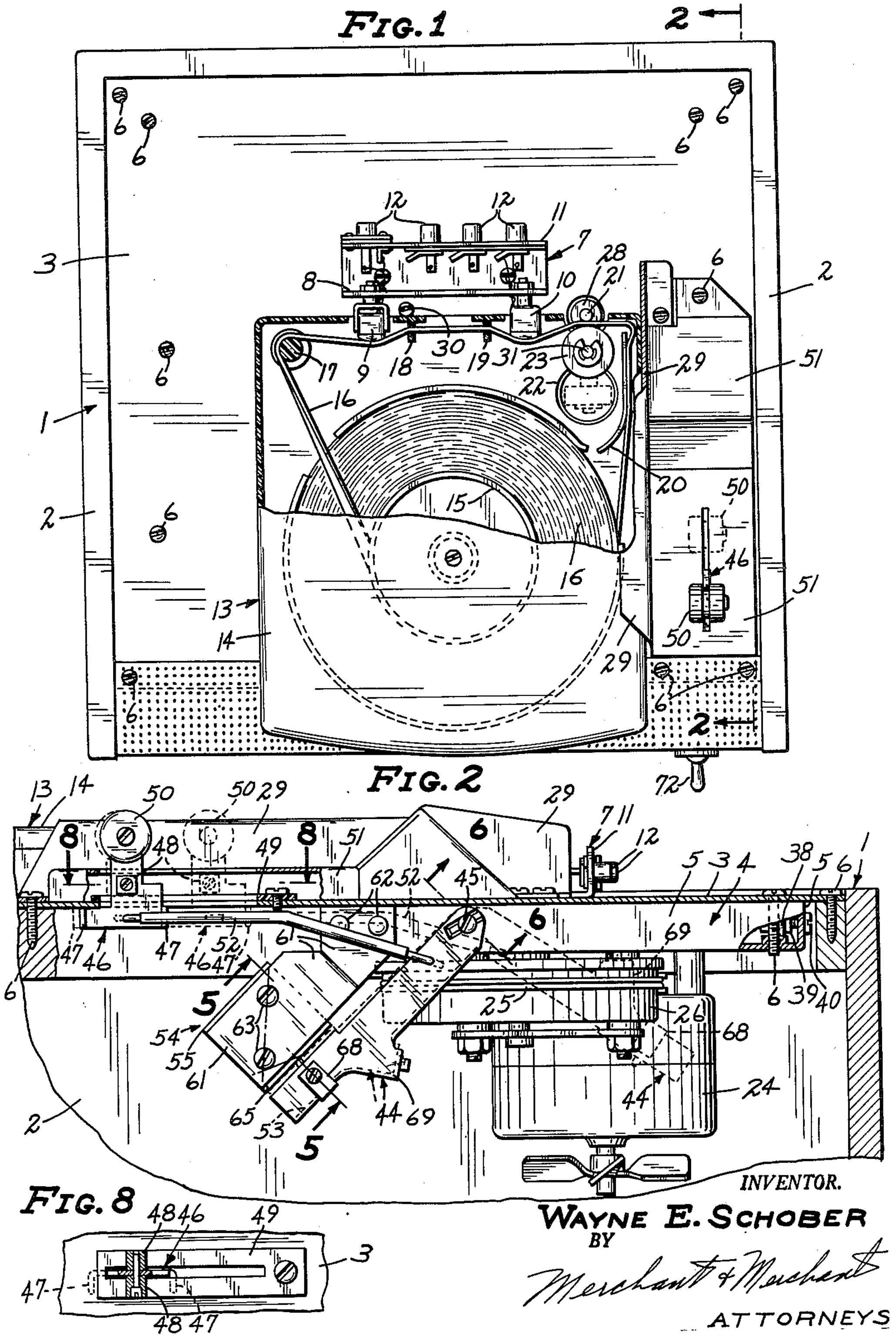
FIG. 1 is a view in top plan of a magnetic tape machine embodying the invention, and which machine has been hereinbefore described.
FIG. 2 is an enlarged fragmentary view in vertical section taken approximately on the line 2—2 of FIG. 1, and showing certain of the elements of the invention in one position by full lines and in another position by dotted lines.
FIG. 8 is a sectional view taken on the line 8—8 of FIG. 2.

In connection with the above description of the drawings, it will be noted that the tape cartridge has been shown only in FIGS. 1–9.

*Embodiment of FIGS. 1–8*

Referring with greater particularity to the drawings, and particularly FIGS. 1–8 thereof, all of the parts of the tape handling machine herein illustrated are mounted on and carried by a deck 1 which provides the upper wall of a casing structure further comprising side walls 2. The deck 1 is a composite structure comprising an upper deck plate 3 seated directly on the upper portions of the walls 2 and a sub-panel 4 carried by the deck plate 3 and disposed in downwardly spaced relation to the latter. The sub-panel 4 is pan-shaped and comprises upturned side flanges 5 seated directly against the bottom of the deck plate 3 and secured to the deck plate 3 by means of screws or the like 6 which are threaded into the sub-panel 4.

An elongated cross-sectionally generally U-shaped mounting bracket 7 is mounted on the upper surface of the deck plate 3 of the deck 1 and is adapted to carry and position one or more electromagnetic heads. As shown for the purpose of the example, there are two such heads mounted on the front or lower flange 8 of the bracket 7, one being a commercially available erase head 9 and the other being a commercially available recording and/or playback head or transducer 10. Carried by a rear flange 11 of the bracket 7 are a plurality of conventional pin jacks 12, one of which is electrically connected to the winding, not shown, of the erase head 9 and the other of which is electrically connected to the winding, not shown, of the recording and/or playback head or transducer 10, and two of which remain unused in the present situation.

Referring to FIG. 1, it will be noted that the tape cartridge is indicated in its entirety by the reference numeral 13, the outer shell thereof by the reference numeral 14, the single journalled tape reel or spool by the reference numeral 15, the magnetic tape by 16, a cylindrical tape guide post by 17, and tape guiding flanges by the reference numerals 18, 19, and 20 respectively. The tape 16 travels over the guide post 17 and the tape guiding flanges 18—20 during its passage from and back to the endless coil of tape 16 which is wound on the tape reel spool 15. The tape cartridge 13 is provided in its end wall adjacent the bracket 7 with openings to receive the heads 9 and 10 and to receive a capstan 21, and is also provided in its bottom wall with an aperture 22 to receive a capstan pressure roller 23 which cooperates with the cylindrical surface of the capstan 21 to drive or transport the tape 16 from and back to the coil on the cartridge spool 15. In the particular machine illustrated the pressure roller 23, which is usually formed of rubber, is swingably retractable from its operative position shown and wherein it presses the magnetic tape 16 into tight frictional engagement with the capstan 21 to an inoperative position below the upper surface of the upper deck plate 3, and for which purpose there is provided in the upper deck plate 3 an aperture generally corresponding to and generally aligned with the aperture 22 in the bottom of the cartridge shell 14.

Without any particular consequence regarding this invention, the capstan 21 may be power driven at a constant speed or at different selected constant speeds by any suitable drive mechanism. However, in the machine illustrated the capstan drive mechanism, which is only partially illustrated, comprises a constant speed electric motor 24, a motor driven resilient belt 25 and a large diameter speed reducing flywheel-acting pulley 26 securely mounted on a spindle 27, the upper end portion of which defines the capstan 21. The capstan spindle 27 is journalled in the sub-panel 4 by means of a bearing 28. As shown, the capstan 21 projects through and above the upper deck plate 3 and it is disposed with its axis generally normal to the plane of the upper deck plate 3, that is to say it projects generally vertically when the upper deck plate 3 is horizontally disposed. Of course, the machine may be used with the deck 1 disposed in various positions other than the horizontal position shown, and for that reason it must be appreciated that the terms upper, lower, vertical, and horizontal are used herein to describe the relationship of various elements of this invention when the deck 1 of the machine is in a horizontal position.

In order to aid in the proper positioning of the tape cartridge 13 with relation to the capstan 21 and the heads 9, 10, there is provided on the upper surface of the upper deck plate 3 an upstanding guide flange 29. It is noted that the capstan pressure roller 23 is retracted to a below deck position for the purpose of inserting and removing the tape cartridge 13 with respect to the machine. This permits the application and removal of the tape cartridge 13 by sliding it back and forth on the upper surface of the deck plate 3 while it is maintained in proper alignment against the side of the guide flange 29. There is also provided on the deck plate 3 an upwardly projecting stop 30 against which the outer shell 14 of the tape cartridge 13 is seated when the same is in its operative position shown in FIG. 1, said stop 30 therefore being provided for the purpose of definitely establishing the operative position of the tape cartridge 13. It is noted that the portion of this invention which has so far been described with respect to the drawings is substantially similar to my copending United States patent application for a "Tape Handling Machine," Serial No. 721,242, filed March 13, 1958, now Patent No. 3,023,943.

The pressure roller 23 is freely journalled on the projecting end of a stub shaft 31 which is rigidly connected to and projects radially from the intermediate portion of a rock shaft 32 which is pivotally mounted to the deck structure 1 for rocking movements such as will move the pressure roller 23 about an axis which is generally normally to and radially offset from the axis of the capstan 21 and which axis is in a plane offset from the tape engaging surface of the capstan 21 in a direction parallel to the capstan axis. One end 33, which may be called the outer end, of the rock shaft 32 is pivotally mounted within a bearing aperture 34 defined in the side flange 5 of the sub-panel 4 (see FIG. 6). The other end 35, which may be called the inner end, of the rock shaft 32 is pivotally carried by an angularly slotted bearing end portion 36 of an elongated mounting bar 37. The other end 38 of said mounting bar 37 defines a boss element 39 which receives an adjustment screw 40 for securing the mounting bar 37 to a portion of the side flange 5 of the sub-panel 4 which is adjacent to the side flange securement of the outer end 33 of the rock shaft 32 (see FIG. 3). It is noted that the adjustment screw 40 provides an externally available means for adjusting the inner end 35 of the rock shaft 32 about the outer end 33 thereof so that an adjustment is available for compensating for the ordinary wear of the pressure roller 23, as will hereinafter be more specifically set forth. As seen particularly in FIGS. 3 and 7, a tension spring 41 is provided for biasing the inner end 35 of the rock shaft 32 within said slotted portion 36 of said mounting bar 37, one end of the spring 41 being hooked, as at 42, in the sub-panel 4 of the deck 1, and the other end of the spring 41 being received within an axially opening radially spaced small bore 43 defined by the inner end 35 of the rock shaft 32. It is noted that other purposes of the spring 41 will be set forth and completely described hereinafter.

Figure 6:
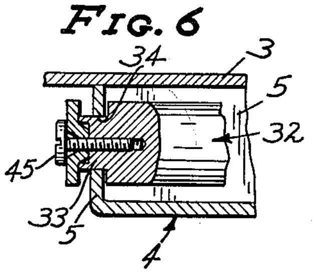
FIG. 6 is an enlarged sectional view taken on the line 6—6 of FIG. 2, some parts being broken away.
Figure 7:
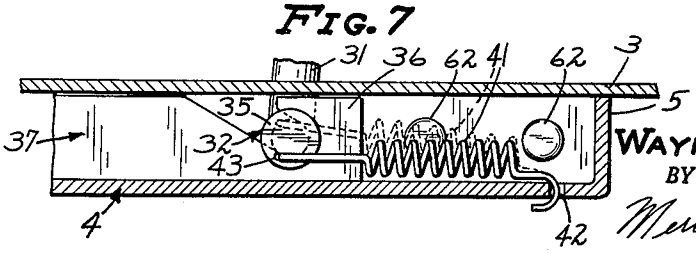
FIG. 7 is an enlarged sectional view taken on the line 7—7 of FIG. 3.
Figures 9, 10:
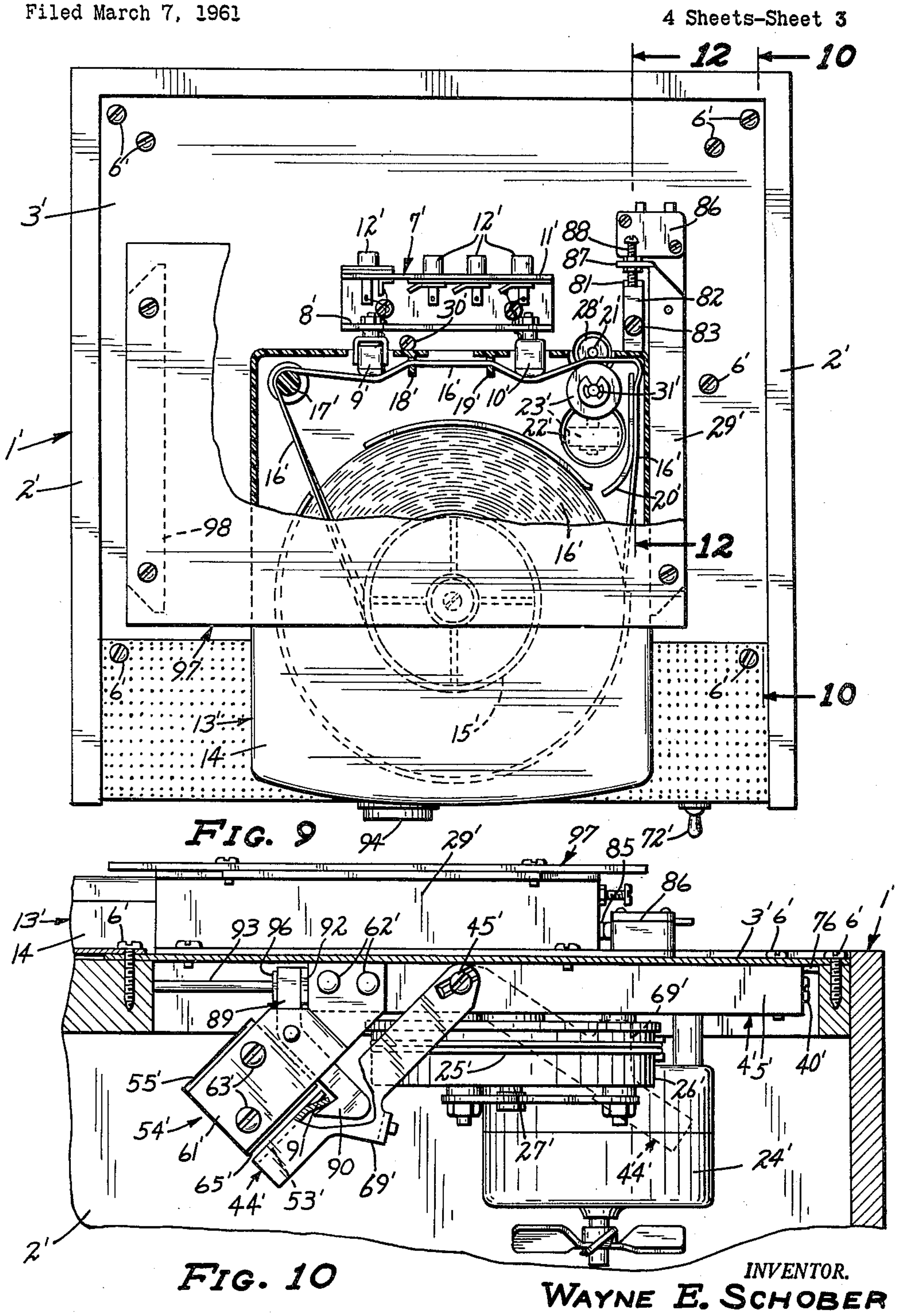
FIG. 9 is a view similar to FIG. 1, but showing an alternative embodiment of my invention.
FIG. 10 is a view similar to FIG. 2, but being taken on the line 10—10 of FIG. 9.

In accordance with my invention, the immediately above described mounting of the pressure roller 23 is designed so as to permit arcuate swinging movements thereof about the axis of the rock shaft 32 toward and away from the capstan 21 between an operative tape-driving position above the tape cartridge supporting surface of the upper deck plate 3 wherein the pressure roller 23 presses the tape 16 into frictional driving engagement with the capstan 21 and an inoperative position below the tape cartridge supporting surface defined by the upper deck plate 3. The extreme inoperative and extreme operative positions of the pressure roller 23 are shown by the dotted lines of FIG. 4. Obviously, means must be provided for moving said pressure roller 23 between the above described inoperative and operative positions, and therefore it is disclosed that such means might comprise a crank arm, represented generally by the reference numeral 44, which is rigidly secured to the outer end portion 33 of the rock shaft 32, which end portion 33 projects outwardly of the side flange 5 of the deck 1, as shown in FIG. 6. The upper end of the crank arm 44 is secured to said outer end portion 33 of the rock shaft 32 by means of the cap screw 45, and the lower end of the crank arm 44 depends below the deck 1, as seen particularly in FIG. 2. It will be noted by reference to FIG. 2 that the positions of the crank arm 44 which correspond with the extreme operative and inoperative positions of the pressure roller 23 are shown by dotted lines.

No matter what means could be devised or provided for actuating the crank arm 44 between the widely angular dotted line position thereof shown in FIG. 2 so as to actuate the pressure roller 23 between the above described extreme operative and inoperative positions thereof, relatively great inertia forces are bound to accumulate. It has been determined that the presence of said inertia forces are highly objectionable because of the relatively great probability of damage to the pressure roller 23 and also to the other mechanism of the machine resulting from said inertia forces. Therefore, this invention discloses means for dividing or sectioning the swinging movement of the pressure roller 23 between the above described inoperative and operative positions thereof so as to greatly alleviate the possibility of hard wear and resulting damage to the tape machine. Generally speaking, the alleviation of said possibility of said hard wear and damage is accomplished by a diminution of the application of said inertia forces to the pressure roller 23 and also of the transfer of said forces to the capstan 21 and the associated mechanism. Therefore, it is in accordance with this invention to provide manually operated means connected with the rock shaft 32 for causing that portion of the swinging movement of the pressure roller 23 between the above described inoperative position thereof and a near operative position thereof above the tape cartridge supporting surface of the upper deck plate 3 in closely spaced relation to the capstan 21, this portion of the swinging movement of the pressure roller 23 being a great percentage of said total swinging movement. Also, it is in accordance with this invention to provide magnetically operated means connected to the rock shaft 23 for causing that final portion of the swinging movement of the pressure roller 23 between the above described operative position thereof and said fully operative position thereof, which last said portion of said swinging movement comprises the remainder of the swinging movement between said extreme operative and inoperative positions not achieved by the manually operated means, and which last said portion is therefore a very small percentage of the total swinging movement of said pressure roller 23.

The above described manually operated means comprises a slide control element 46 received in an elongated slot defined in the upper deck plate 3, said slide element 46 being so disposed for sliding movements normal to the axis of the rock shaft 32 and parallel to the plane traversed by the swinging movement of the pressure roller 23. The slide element 46 defines lower guide ears 47 and an upper guide bar 48 which are disposed on opposite respective sides of the upper deck plate 3. As shown in FIGS. 2 and 8, the upper bar 48 rides on a bearing plate 49 which is secured to the upper deck plate 3. Also, the slide element 46 is provided at its upper end with a control knob 50, and the slide element 46 is also substantially enclosed by a slotted cover plate 51. For the purpose of imparting the above described sliding movements of the control element 46 to the crank arm 44 whereby to control the above described swinging movement of the pressure roller 23 between said inoperative and near operative positions, a link element 52 is secured at one end to said slide element 46 and at its other end to the crank arm 44 generally intermediate the opposite ends thereof. It should be here noted that the above described tension spring 41 is so connected to the inner end 38 of the rock shaft 32 that the crank arm 44 and the pressure roller 23 are biased or stabilized in their respective inoperative and near operative positions, said positions of said crank arm 44 being shown in FIG. 2 and said positions of said pressure roller 23 being shown in FIG. 4.

The magnetically operated means noted above for causing that portion of the swinging movement of the crank arm 44 and the pressure roller 23 between said near operative and fully operative positions comprises a laterally extending magnetically responsive plate or clapper type armature 53 defined by the lower portion of the crank arm 44, which cooperates with and comprises a portion of an electromagnetic actuator, represented generally by the reference numeral 54, the same being hereinafter sometimes referred to as an electromagnet. It is noted that an electromagnetic actuator having a so-called plate or clapper type armature, as distinguished from a plunger type armature, produces a very strong magnetic attraction when and only when the armature is very close to the poles of the core structure. As noted in the introduction to this specification, the same has many very definite advantages when utilized in combination with a tape driving mechanism, some advantages being greatly reduced noise and jarring resulting from reduced inertia forces.

Figure 3:
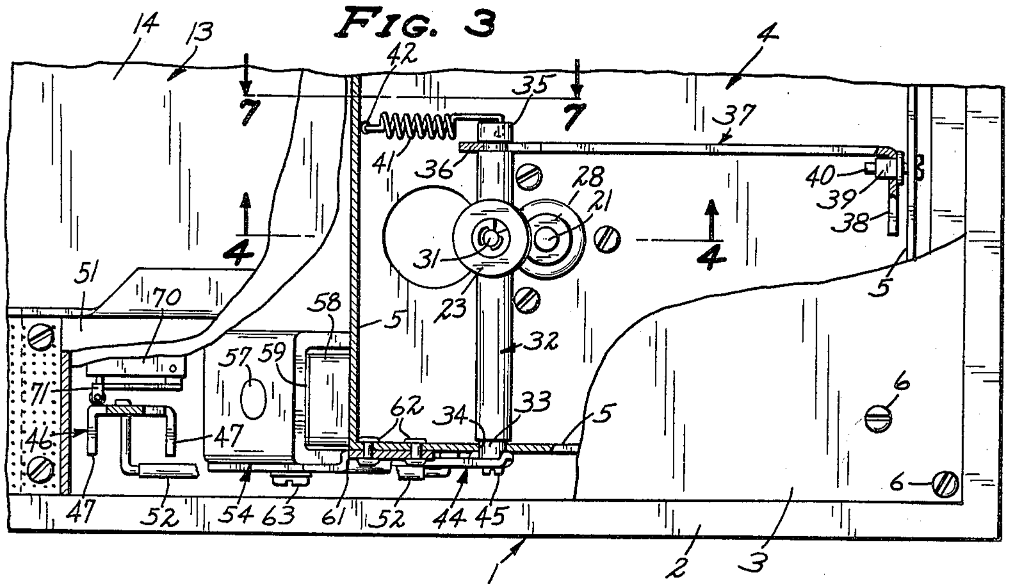
FIG. 3 is an enlarged fragmentary view in top plan, some parts being broken away and some parts shown in section.
Figure 4:
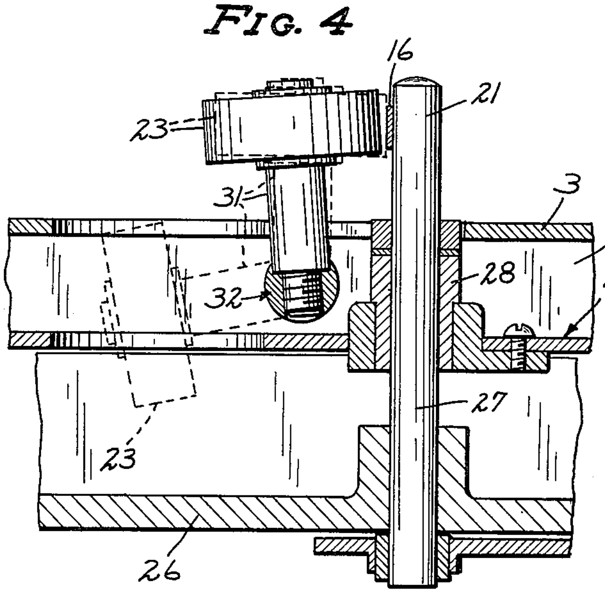
FIG. 4 is a further enlarged view in vertical section taken on the line 4—4 of FIG. 3, but showing the pressure roller of said machine in the above described near operative position by full lines, and in its inoperative and operative positions by dotted lines.
Figure 5:
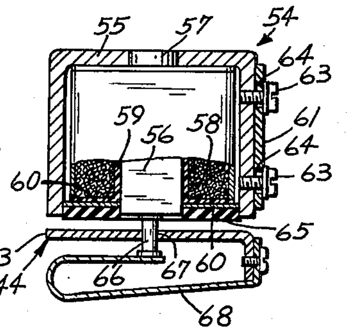
FIG. 5 is an enlarged sectional view taken substantially on the line 5—5 of FIG. 2, some parts being broken away.

Referring to FIGS. 2, 3, and 5, the electromagnet 54 comprises a generally channel-shaped core bracket 55, an elongated central core portion 56 rigidly secured at 57 to the core bracket 55, a helical coil or solenoid 58 wound around the central core portion 56 and separated from said core portion 56 and the core bracket 55 by an insulator shell 59. Also, a cover or spacer plate 60 is disposed intermediate the spaced ends of the core bracket 55. Of course, the core bracket 55 and the central core portion 56 of the electromagnet 54 and the armature 53 of the crank arm 44 are formed from a magnetic flux conducting material. The electromagnet 54 is rigidly secured to the deck 1 in a position shown in FIG. 2 by means of a mounting bracket 61 which is secured to the side flange 5 of the sub-panel 4 at 62 and is also secured to the core bracket 55 by means of the cap screws 63. It is noted that the cap screws 63 are received within enlarged apertures 64 defined in the mounting bracket 61 so as to permit relative adjustment between the mounting bracket 61 and the electromagnet 54, the purpose of such adjustment being set forth hereinafter. Since the spacing between the near operative and fully operative positions of the pressure roller 23 need be only sufficient to maintain the pressure roller 23 out of driving engagement with the tape 16 and the capstan 21, the spacing between the electromagnet 54 and the armature 53 of the crank arm 44 is preferably therefore held to a minimum. Therefore, it is also preferred that the relatively forceful manually operated swinging movement of the crank arm 44 between the inoperative and near operative positions thereof be cushioned from the electromagnet 54 by means of a resilient cushion plate 65, which may be formed of rubber or any other suitable material. It is noted that the armature 53 of the crank arm 44 is maintained in its preferred spaced relationship with the electromagnet 54 by means of a softly biased button 66 which projects through the centrally defined aperture 67 in the armature 53, and which is biased in its preferred position by means of a transversely disposed leaf spring 68. The crank arm 44 also defines a resilient button-carrying stop tab 69 which stops against the sub-panel 4 of the deck 1 in order to limit and define the inoperative position of my invention. Also a micro switch 70 is secured to the deck 1 and is actuated by a roller-equipped actuating element 71 when the slide element 46 is moved to its forward position shown in FIGS. 1 and 2, whereby to energize the capstan powering electric motor 24.

*Operation of the Embodiment of FIGS. 1–8*

Referring to the embodiment of my invention shown in FIGS. 1–8, it is thought that the operative simplicity thereof should be easily understandable; however, it might be well to briefly outline said operation. Assuming that the pressure roller 23 and its associated mechanism is in the above described inoperative position shown by dotted lines in FIGS. 2 and 4, and after the tape cartridge 13 is inserted in the tape machine to its position on the upper deck plate 3 shown in FIG. 1, the control knob 50 of the manually operated slide element 46 may be moved forwardly to the full length position shown in FIGS. 1 and 2, so as to move the crank arm 44 and the pressure roller 23 to their respective above described near operative positions (shown in full lines in FIGS. 2 and 4). It should be emphasized that at this point, that is to say the near operative position of the pressure roller 23, the tape cartridge 13 is locked in its position on the deck 1 but the pressure roller 23 is still maintained in its spaced relation to the tape 16 and the capstan 21 of the machine. Also, the movement of the slide element 46 to said full line position causes engagement thereof with the roller-equipped actuating element 71 of the micro switch 70 so as to energize the electric motor 24 and start the revolution of the capstan 21. Thereafter, when it is desired to place the tape 16 in its playing position by causing driving engagement between the pressure roller 23 and the capstan 21, the same may be remotely accomplished by actuating the electromagnet switch 72 whereby to energize the electromagnet 54 and thereby produce a flux circuit which includes the armature 53 of the crank arm 44 so as to impart to the pressure roller 23 the final portion of the swinging movement of the pressure roller 23 between said near operative and operative positions. Of course, the armature 53 of the crank arm 44 is thereby attracted to the electromagnet 54 and the relatively small final portion of the swinging movement of the pressure roller is thereby accomplished so as to place the pressure roller 23 into its tape driving position in engagement with the capstan 21. It is noted that said final portion of the swinging movement might easily be taken up merely by means of the slack normally present in the linkage of my invention.

*Adjustments Provided by My Invention*

It was noted above that the cap screws 63 which secure the core bracket 55 of the electromagnet 54 to the deck 1 are received within enlarged apertures 64 so as to provide means for adjusting the position of the electromagnet 54 with respect to the near operative position of the armature 53 of the crank arm 44. Such an adjustment provides means for increasing or decreasing the magnetically controlled portion of the swinging movement of the pressure roller 23 between the near operative and operative positions thereof whereby to adjust the tape machine for parallelism between the respective axes of the pressure roller 23 and the capstan 21. Such an adjustment is necessary in order to prevent the axial running of the tape 16 with respect to the pressure roller 23 and the capstan 21.

Another adjustment is provided by the adjustment screw 40 which provides means for moving the inner end 38 of the rock shaft 32 about the outer end 33 thereof whereby to provide a considerable range of adjustment for compensating for normal wear of the pressure roller 23 without affecting the parallelism between the respective axes of the pressure roller 23 and the capstan 21. It is noted that such adjustment does not affect the parallelism between said axes because the resiliency of the pressure roller 23 is such that the same will yield to such minor adjustments so that the axes of the pressure roller shaft 31 and the capstan 21 remain parallel. The above adjustments are unique in that they provide means for a factory setting of the machines so that the axes of the pressure roller shaft 31 and the capstan 21 are parallel at the proper pressure between the pressure roller 23 and the capstan 21, and still allow minor adjustments in the pressure of the pressure roller 23 to be made in the field without affecting the parallelism between the respective axes of the pressure roller 23 and the capstan 21.

*Embodiments of My Invention Shown in FIGS. 9–13*

Figures 11, 12:
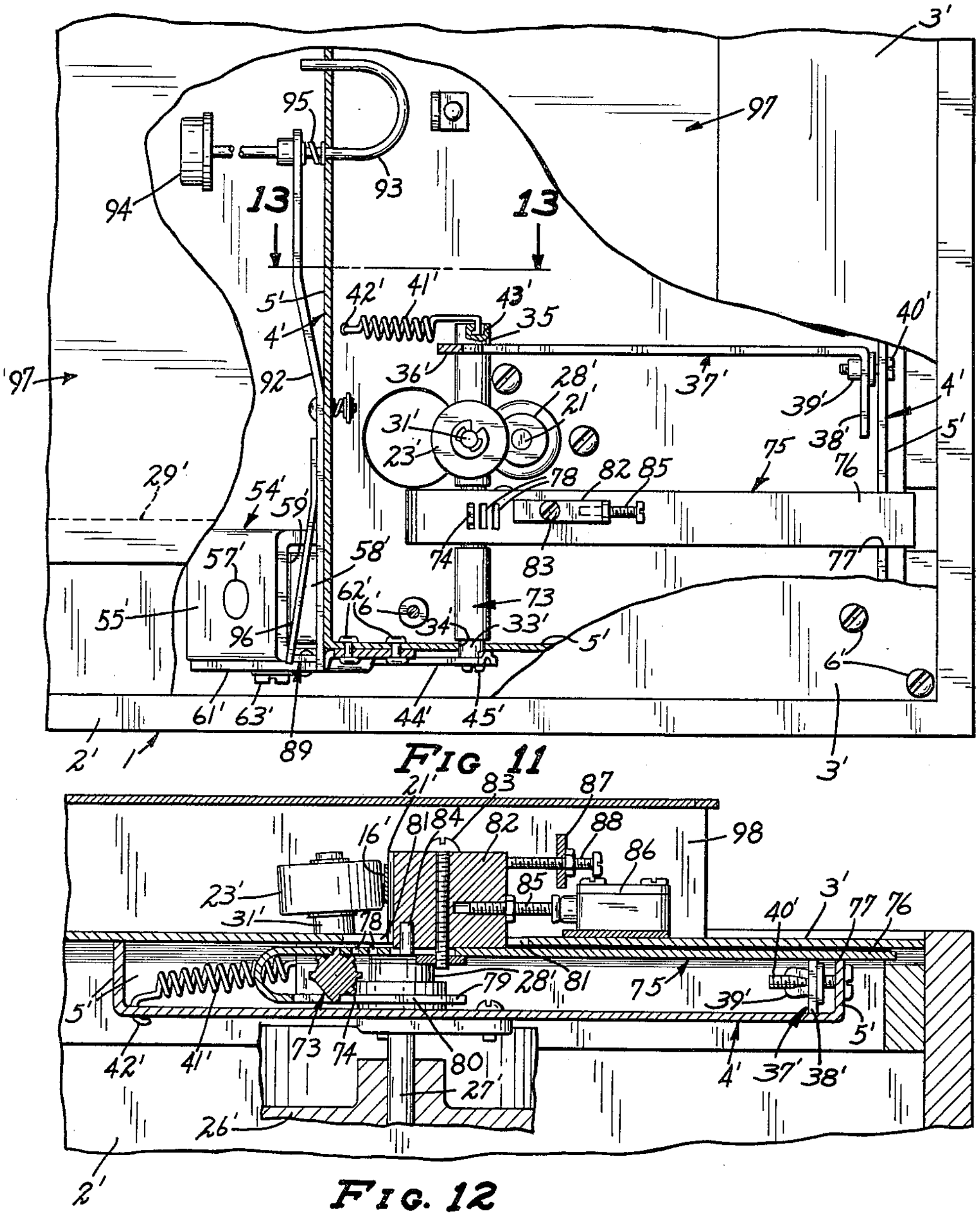
FIG. 11 is a view similar to FIG. 3, but being an enlarged fragmentary view in top plan of the embodiment of my invention shown in FIG. 9, some parts being broken away and some parts shown in section.
FIG. 12 is an enlarged view in vertical section taken on the line 12—12 of FIG. 9, some parts being broken away.
Figure 13:
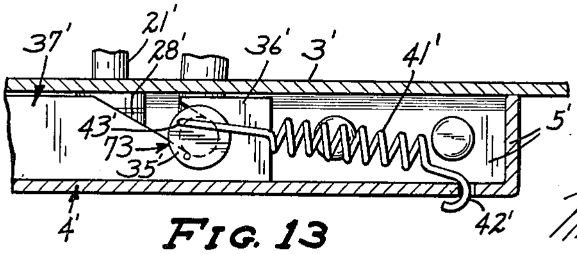
FIG. 13 is an enlarged view in vertical section taken on the line 13—13 of FIG. 11.

Referring to FIGS. 9–13 of the drawings, an alternative embodiment of my invention is shown therein, and the differences in said embodiment from the first described embodiment of my invention shown in FIGS. 1–8 will be specifically hereinafter described. It should be noted that the alternative embodiment of my invention shown in FIGS. 9–13 and hereinafter described corresponds in all respects not specifically hereinafter enumerated to the above described embodiment of my invention shown in FIGS. 1–8, and the parts or elements of said alternative embodiment which correspond to like parts or elements in FIGS. 1–8 are denoted by the use of the same reference characters with prime marks added thereto. Generally speaking, the alternative embodiment of my invention differs from the embodiment thereof shown in FIGS. 1–8 only in the means used for actuating the manually operated portion of the swinging movement of the pressure roller 23′ between its inoperative and near operative positions. Referring particularly to FIGS. 11 and 12, a rock shaft 73 is mounted in a manner similar to the rock shaft 32 of the first described embodiment of my invention. However, the rock shaft 73 is formed intermediate its opposite ends to define a pinion gear 74 which cooperates with an elongated rack bar 75. The rear end 76 of the rack bar 75 is received within a notched portion 77 of the side flange 5′ of the sub-panel 4′ of the deck 1′. The forward portion of the rack bar 75 defines a plurality of longitudinally spaced transversely extending gear tooth receiving apertures 78, and the forward portion of the rack bar 75 also defines a slotted return bend 79 which defines a guide way 80 for maintaining the proper transverse spacing of the rack bar 75. The upper deck plate 3′ defines an elongated aperture 81 through which an upstanding actuating or abutment element 82 projects, said abutment element 82 being rigidly secured by means of a bolt 83 to said rack bar 75. Also, the abutment element 82 is maintained in vertical alignment with the rack bar 75 by means of a peg 84. The immediately above described mechanism is in effect a substitution for the manually operated slide control element 46 of the first described embodiment of my invention, and the abutment element 82 is so disposed that it lies in the path of travel traversed by the tape cartridge 13′ when the same is received by the tape machine whereby said abutment element 82 is engaged by the tape cartridge 13′ during the manual insertion thereof on the upper deck plate 3′ so that the insertive movement of the cartridge 13′ imparts to the pressure roller 23′ that portion of the swinging movement thereof between the inoperative and near operative positions of the pressure roller 23′. It is noted that the inoperative, near operative, and operative positions of the pressure roller 23′ of this alternative embodiment of my invention correspond to the same positions thereof described above with respect to the embodiment of my invention shown in FIGS. 1–8.

In accordance with this alternative embodiment of my invention, the abutment element 82 is provided with a rearwardly projecting adjustable screw 85 which actuates a micro switch 86 when said abutment element 82 is moved to its rearward position shown in FIG. 12 whereby to energize the capstan driving electric motor 24′. Also, the tape cartridge guide flange 29′ is provided with a laterally projecting tab 87 which carries an adjustable stop screw 88. The stop screw 88 is provided for the purpose of preventing the insertion of the tape cartridge 13′ with such force that the same will cause engagement of the pressure roller 23′ with the capstan 21′ whereby to cause unwanted, sudden, and anticipatory engagement of the tape 16′. By reference to FIG. 13, it will be noted that the tension spring 41′ is disposed so as to impart a bias to the pressure roller 23′ only in the direction of its inoperative position. Therefore, a lever hook 89 is pivotally secured at its generally intermediate portion to the electromagnet mounting bracket 61′, as shown particularly in FIGS. 10 and 11. One end of the lever hook 89 defines a hook portion 90 which cooperates with an angularly formed portion 97 of the flange portion 53′ of the crank arm 44′, and the other end of the lever hook 89 is disposed so that it is engaged by a generally horizontally disposed elongated lever 92. The lever 92 is pivotally secured intermediate its opposite ends to the flange portion 5′ of the sub-panel 4′ and is actuated by means of a J-bar 93. Referring particularly to FIG. 11, the J-bar 93 is received at opposite portions thereof within the side flange 5′ of the sub-panel 4′. The J-bar 93 is also provided with a conveniently disposed release button 94 for causing disengagement of the hook portion 90. The elongated lever 92 is biased in spaced relationship away from the side flange 5′ of the sub-panel 4′ by means of a coil spring 95, and the upper end of the lever hook 89 is maintained in engagement with the lever 92 by means of the leaf spring 96. With this arrangement, the crank arm 44′ is maintained in the near operative position thereof, shown in full lines in FIG. 10, to thereby maintain the pressure roller 23′ in its near operative position, shown in full lines in FIG. 12. Also, the pushing of the button 94 of the J-bar 93 causes the hook portion 90 of the lever 89 to become disengaged from the crank arm 44′. It will be noted that the alternative embodiment of my tape machine is disclosed with a vertically spaced top cover plate 97 which is secured on one side to the guide flange 29′ and is secured on the other side to a similar spacer flange 98.

*Operation of Alternative Embodiment*

The operation of this embodiment of my invention is similar to the operation of the first described embodiment thereof in all respects except the manually operated portion of the swinging movement of the pressure roller 23′. It should be emphasized that it is the manual insertion of the tape cartridge 13′ which accomplishes the manual portion of the swinging movement of the pressure roller 23′. The insertive movement of the tape cartridge 13′ is imparted to the pressure roller 23′ by means of the abutment element 82, the rack bar 75 and the rock shaft 73. Such inserted movement thereby moves the pressure roller 23′ between its inoperative and near operative positions (see FIG. 4), and the lever hook 89 retains the pressure roller 23′ in said near operative position. Hereafter, the final portion of the swinging movement of the pressure roller 23′ between the near operative position thereof and the fully operative position thereof is accomplished by the electromagnet 54′ in the same manner as outlined above with respect to the first described embodiment of my invention.

This invention has been thoroughly tested and found to be completely satisfactory for the accomplishment of the above and other important objects; and while I have shown and described a preferred embodiment thereof, I wish it to be specifically understood that the same may be modified without departure from the scope and spirit of the appended claims.

What I claim is:

1. In a magnetic tape cartridge handling machine; a supporting structure defining a tape cartridge supporting surface over which a tape cartridge is movable to and from an operative tape driving position, tape driving mechanism comprising a power driven capstan and a cooperating idle pressure roller; the power driven capstan being journalled on the supporting structure for rotation about an axis generally normal to said cartridge supporting surface and having a tape driving surface outwardly of one side of said cartridge supporting surface for frictional driving engagement with one side of a tape to be driven thereby; the cartridge being slidable over said supporting surface toward and from an operative position wherein a portion of the tape carried thereby is orientated immediately adjacent the tape driving surface of the capstan; a rock shaft mounted for rocking movements on the supporting structure about an axis that is generally normal to the capstan axis and is radially spaced from said capstan axis; the pressure roller being adapted to engage the side of the tape opposite that engaged by the capstan to maintain the tape in frictional driving engagement with the capstan; means mounting the pressure roller on the rock shaft for free rotation about its own axis and for arcuate swinging movements about the axis of the rock shaft toward and away from the capstan between an operative tape driving position, wherein the axis of the pressure roller is parallel to the axis of the capstan and a portion of a cartridge carried tape interposed between the pressure roller and capstan is pressed thereby into frictional driving engagement with the capstan and wherein the pressure roller is in the path of travel of a cartridge carried tape during movements of the cartridge over its supporting surface to and from its operative position, and an extreme inoperative position, wherein the pressure roller is spaced from the path of travel of the cartridge carried tape during movements of the cartridge over the cartridge supporting surface to and from an operative position of the cartridge; first and second control means for the pressure roller; the first-said pressure roller control means being operative to move the pressure roller from its said extreme inoperative position to and releasably retain it in a near operative position wherein it is disposed closely adjacent the capstan but is sufficiently spaced therefrom to produce no frictional driving pressure between the capstan and a cartridge carried tape interposed between the capstan and pressure roller and wherein the pressure roller is in the path of travel of a portion of the cartridge during sliding movements of the cartridge over the cartridge supporting surface to and from its operative position; the second pressure roller control means being operative to move the pressure roller from its said intermediate near operative position to and releasably retain it in its said operative tape driving position; the said second pressure roller control means being an electromagnetic actuator comprising a magnetic flux circuit defining core structure and associated solenoid fixedly mounted on the supporting structure of said machine and further defining a magnetically responsive clapper-type armature mounted on the pressure roller carrying rock shaft through the medium of a rock shaft carried crank arm for swinging movements toward and from the flux conducting core structure.

2. The structure defined in claim 1 in further combination with yielding means urging the pressure roller toward its said extreme inoperative position.

3. The structure defined in claim 1 in further combination with yielding means urging the pressure roller from its operative position to its near operative position.

4. The structure defined in claim 1 in which the flux circuit defining core structure has spaced pole defining ends which provide a flux gap adjacent one end thereof, and in which the said cooperating magnetically responsive armature is positioned closely adjacent the pole defining ends of the core structure and substantially closes the magnetic gap therebetween when the said pressure roller is in its operative tape driving position.

5. The structure defined in claim 2 in which the said first pressure roller control means further comprises an automatically set manually releasable latch mechanism for releasably retaining the pressure roller operating crank arm and armature against movements from its said near operative position to its said extreme inoperative position.

6. The structure defined in claim 4 in which the said first pressure roller control means further comprises an automatically set manually releasable latch mechanism for releasably retaining the pressure roller operating crank arm and armature against movements from its said near operative position to its said extreme inoperative position.

7. The structure defined in claim 2 in which the first-said pressure roller control means comprises a movable tape cartridge actuated operating element mounted in the path of travel of a tape cartridge to and from its said operative position and operative linkage therebetween and the rock shaft, whereby the pressure roller is automatically moved from its extreme inoperative position to its intermediate near operative position under sliding movements of the tape cartridge over the cartridge supporting surface to its operative position, and automatically set manually releasable latch means for releasably retaining said armature and crank arm, rock shaft and pressure roller against return movements to thereby prevent undesired return movements of the pressure roller from its said intermediate near operative positions to its extreme inoperative position.

8. The structure defined in claim 1 in further combination with a resilient bumper element interposed between said core structure of said actuator and said armature for limiting the movements of said armature toward said core structure to a position wherein said armature is slightly spaced in flux conducting relationship from said core structure.

9. In a tape driving mechanism for use with a magnetic tape machine, a supporting structure, a power driven capstan journalled on said supporting structure and having a surface for frictional driving engagement with one side of the tape to be driven thereby, an idle pressure roller adapted to engage the side of the tape opposite that engaged by the capstan so as to maintain the tape in frictional driving engagement with the capstan, means mounting said pressure roller on said supporting structure for arcuate swinging movements toward and away from said capstan between an inoperative position relatively widely spaced therefrom and an operative tape driving position wherein said pressure roller presses said tape into driving engagement with said capstan and wherein the axis of said pressure roller is generally parallel with the axis of said capstan, means for actuating said swinging movements of said pressure roller, and adjustment means for slightly varying the operative position of said pressure roller whereby to adjust said machine for parallelism between the respective axes of the pressure roller and the capstan.

10. In a tape driving mechanism for use with a magnetic tape machine, a supporting structure, a power driven capstan journalled on said supporting structure and having a surface for frictional driving engagement with one side of the tape to be driven thereby, a rock shaft mounted for rocking movements about an axis that is generally normal to the capstan axis and is radially spaced from said capstan axis, an idle pressure roller adapted to engage the side of the tape opposite that engaged by said capstan so as to maintain the tape in frictional driving engagement with the capstan, means mounting said pressure roller on said rock shaft for arcuate swinging movements about the axis of said rock shaft toward and away from said capstan between an inoperative position relatively widely spaced therefrom and an operative tape driving position wherein said pressure roller presses said tape into driving engagement with said capstan and wherein the axis of said pressure roller is generally parallel with the axis of said capstan, means for actuating said swinging movements of said pressure roller, and adjustment means mounting one end of said rock shaft on said supporting structure for limited pivotal movements of said rock shaft about the other end thereof in a direction generally normal to the axis of said capstan whereby to provide an adjustment for said machine which does not effect the parallelism between the respective axes of said pressure roller and said capstan.

11. In a magnetic tape cartridge handling machine; a supporting structure defining a tape cartridge supporting surface; tape driving mechanism comprising a power driven capstan and a cooperating idle pressure roller; a rock shaft mounted for rocking movements on the supporting structure about an axis that is generally normal to the capstan axis and is radially spaced from said capstan axis; means mounting the pressure roller on the rock shaft for arcuate swinging movements about the axis of the rock shaft toward and away from the capstan between an operative tape driving position and an extreme inoperative position; first control means for the pressure roller; said first control means being operative to move the pressure roller from its said extreme inoperative position to and releasably retain it in a near operative position wherein it is disposed closely adjacent the capstan but is sufficiently spaced therefrom to produce no frictional driving pressure between the capstan and a cartridge carried tape interposed between the capstan and the pressure roller; and second pressure roller control means; the second pressure roller control means being operative to move the pressure roller from its said intermediate near operative position to and releasably retain it in its said operative tape driving position; the second pressure roller control means being an electromagnetic actuator comprising a magnetic flux circuit defining core structure and associated solenoid fixedly mounted on the supporting structure of said machine and further defining a magnetically responsive clapper-type armature mounted on the pressure roller carrying rock shaft through the medium of a rock shaft carried crank arm for swinging movements toward and from the flux conducting core structure.

12. The structure defined in claim 11 in further combination with yielding means urging the pressure roller toward its said extreme inoperative position.

13. The structure defined in claim 11 in further combination with yielding means urging the pressure roller from its operative position to its near operative position.

14. The structure defined in claim 11 in which the flux circuit defining core structure has spaced pole defining ends which provide a flux gap adjacent one end thereof, and in which the said cooperating magnetically responsive armature is positioned closely adjacent the pole defining ends of the core structure and substantially closes the magnetic gap therebetween when the said pressure roller is in its operative tape driving position.

15. The structure defined in claim 12 in which the said first pressure roller control means further comprises an automatically set manually releasable latch mechanism for releasably retaining the pressure roller operating crank arm and armature against movements from its said near operative position to its said extreme inoperative position.

16. The structure defined in claim 14 in which the said first pressure roller control means further comprises an automatically set manually releasable latch mechanism for releasably retaining the pressure roller operating crank arm and armature against movements from its said near operative position to its said extreme inoperative position.

17. The structure defined in claim 12 in which the first-said pressure roller control means comprises a movable tape cartridge actuated operating element mounted in the path of travel of a tape cartridge to and from its said operative position and operative linkage therebetween and the rock shaft, whereby the pressure roller is automatically moved from its extreme inoperative position to its intermediate near operative position under sliding movements of the tape cartridge over the cartridge supporting surface to its operative position, and automatically set manually releasable latch means for releasably retaining said armature and crank arm, rock shaft and pressure roller against return movements to thereby prevent undesired return movements of the pressure roller from its said intermediate near operative positions to its extreme inoperative position.

18. The structure defined in claim 11 in further combination with a resilient bumper element interposed between said core structure of said actuator and said armature for limiting the movements of said armature toward said core structure to a position wherein said armature is slightly spaced in flux conducting relationship from said core structure.

References Cited in the file of this patent

UNITED STATES PATENTS

| | | |
|---|---|---|
| 2,864,611 | Gray | Dec. 16, 1958 |
| 2,922,642 | Cousino | Jan. 26, 1960 |
| 3,027,112 | Flan | Mar. 27, 1962 |